June 8, 1971  J. A. BALINT  3,583,073
LEVEL VIAL CONSTRUCTION
Filed June 21, 1968
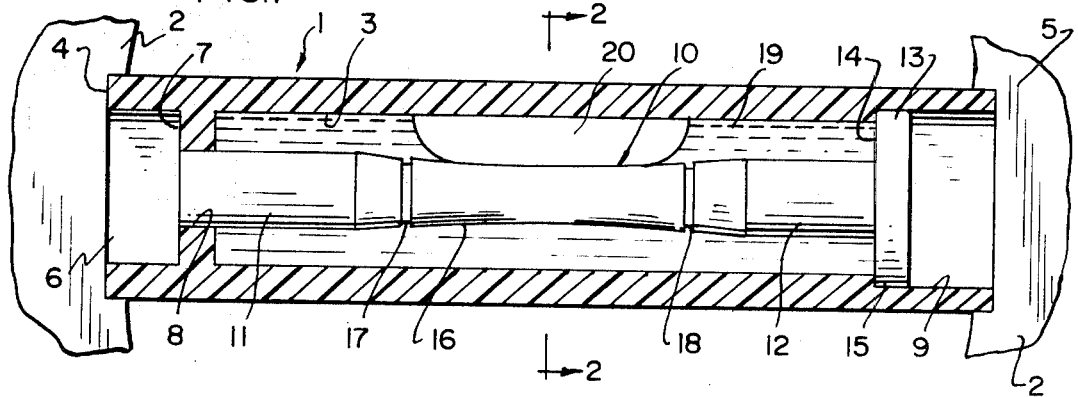
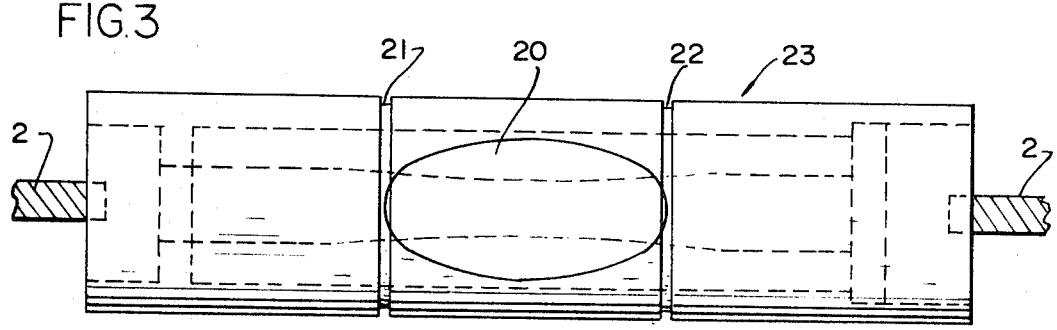
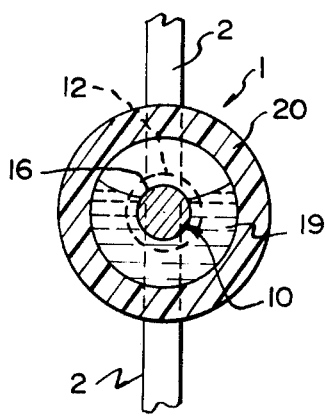
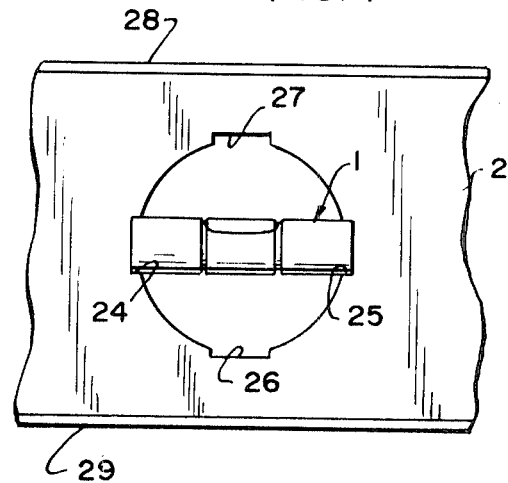
INVENTOR
JOSEPH A. BALINT
BY Petherbridge, O'Neill & Aubel.
ATTORNEYS

United States Patent Office 3,583,073
Patented June 8, 1971

3,583,073
LEVEL VIAL CONSTRUCTION
Joseph A. Balint, Milwaukee, Wis., assignor to Empire
Level Manufacturing Co., Milwaukee, Wis.
Filed June 21, 1968, Ser. No. 739,057
Int. Cl. G01c 9/24
U.S. Cl. 33—211                                    12 Claims

ABSTRACT OF THE DISCLOSURE

A level vial for use in connection with a level instrument for determining angular relationships. The level vial consists of a body which contains a bore designed to serve as a bubble chamber. A core member is secured within the bore of the vial body in a predetermined position. After a quantity of fluid is introduced into the bore and hermetically sealed therein to provide a bubble in the bore or chamber, the configuration and location of the core member secured within the bore serves, in cooperation with the surfaces defining the bore or chamber, to control the position of the bubble within the vial in accordance with the angular disposition of the level vial.

---

The level industry has been confronted with problems relating to the high degree of skill required in the final production phases of level instrument manufacture including relatively slow assembly techniques. This problem was approached and solved by the development of a new level vial and a means for assembling the vial to a suitable frame requiring minimal skills throughout the manufacturing and assembly processes and which materially reduce the time involved in producing a completed level instrument. The new level vial and means for assembling the vial to a frame is set forth in the patent to Donald E. Wright, 3,311,990, issued Apr. 4, 1967, and entitled "Level."

The present invention is aimed at a level and vial construction which will produce substantial reduction in the cost of manufacture of level instruments through a reduction in both basic material costs and labor requirements. Further, instruments produced in accordance with the invention will provide the user great flexibility both in the ease of replacement of broken parts and in the simple method provided for converting the angular relationship of a vial in a particular cell with a working surface of the instrument.

While previous level vials fabricated from plastic materials were ordinarily formed from extruded stock, the vials of the invention can be manufactured utilizing high volume injection molding techniques. A plastic vial material having a high degree of transparency, dimensional stability and workability can be used to produce injection molded vial bodies in accordance with the invention. Such vial bodies can be produced in great quantities at a relatively very low unit cost since the equipment used is capable of high volume production with a minimum of repair, replacement and maintenance.

The vial body of the invention is ordinarily fabricated from an injection molded acrylic plastic. Although a wide variety of plastic materials are available as potential level vial stock, acrylic thermoplastic polymers of butyr ates such as cellulose acetate butyrate are presently preferred because of their degree of transparency; their dimensional stability under broadly varying conditions; and their workability under the stress of high speed production techniques.

The central portion of the interior of the body is generally provided with a cylindrical bore. A pair of parallel annular grooves can be cut into the external periphery of the vial body at a position spaced equidistantly from the midpoint of the bore portion of the vial. These grooves serve as bubble alignment indicator guides. Generally, cylindrical vial end portions establish communication between the central bore portion and the exterior of the vial and provide cylindrical sealing regions at the ends of the vial body. The exterior of the tube is ordinarily provided with precision formed end portions designed for close fitting engagement with precision preformed vial receiving slots in the body of a level instrument.

In the preferred method of manufacture, a precision formed injection molded core member or pin is formed for introduction into the bore portion of the vial body. The core member is formed as an elongated generally cylindrical member having an enlarged coaxially disposed cylindrical cap portion at one end thereof and a centrally located peripherally continuous concave portion formed between the ends of the member. This core member or pin may be provided with a pair of spaced bubble alignment indicator guide lines or grooves which can be cut into the periphery of the core member at a location which will space the grooves equidistantly from the midpoint of the bore portion of the vial body when the core member is installed. These indicator lines may supplement or serve to replace similar grooves formed on the external periphery of the vial body. The provision of indicator guide grooves or lines on the core member as opposed to the vial body will serve both to eliminate errors which can occur through optically produced parallax distortion when the bubble location of the level vial is read from the side and to allow protection of the indicator guide lines or grooves in certain mounting applications.

In assembling the cylindrical vial body and the core member to produce the level vial of the invention, the core member and cylindrical cap portion is inserted into the larger cylindrical vial end portion communicating with the central bore portion of the vial. The tolerances between the cap portion of the core member and the internal peripheral surface of the cylindrical vial end portion are such that the core member can be inserted into the end portion to form an essentially fluid-tight seal between the cap portion of the core member and the abutting vial portion. Also, the abutting surfaces of the cap portion and cylindrical vial end cavity serve an alignment function in establishing the desired axial alignment of core member and vial bubble chamber.

A predetermined quantity of a fluid, such as a mineral spirit, is introduced through an opening formed in the opposite end of the cylindrical vial structure after initial alignment of the core member and vial. When this quantity of fluid has been introduced into the generally centrally located vial chamber, the core member is moved in an axial direction until the end thereof opposite the cap portion enters and closes the fluid introduction opening formed in the vial body. This opening provides a secondary core member alignment element.

After the alignment of the core member has been established through its complete insertion into the cylindrical openings provided in the vial end portions which are resigned to accommodate the respective ends of the core member, a dimensionally stable adhesive or cement is applied to both the vial ends and the exposed core member portions to bond the elements. The adhesive serves to hermetically seal the mineral spirit introduced into the central vial chamber. In some applications, a second adhesive may be applied over the first adhesive to provide a more positive end seal of the fluid chamber.

When the assembly of the level vial elements and sealing thereof has been completed, the core member is positioned in a manner such that its longitudinal axis is coaxially located with respect to the longitudinal axis of the generally cylindrical central bore portion of the vial body. The peripherally continuous concave portion of the core member is preferably located between the cylindrical ends of the core member in the completed level vial. The radius of the core member, at substantially the midpoint of the longitudinal axis of the portion of the core member located in the central fluid chamber of a vial, is a predetermined dimension. The dimension of the core member at selective positions spaced at intervals from the midpoint thereof and in either axial direction are greater than the radial dimension of the core member at the midpoint to control bubble registry in relation to a predetermined angular position of the vial with respect to a workpiece.

The construction of the invention will permit level readings to be taken at 360° around the level vial. This feature enhances the versatility of the vial in assembling it to a level frame.

Since the core member is introduced into the chamber of the level vial ordinarily containing only a bubble forming fluid, the volume of liquid required to produce a bubble in the chamber is considerably reduced. This results in a substantial reduction in bubble size variations which are ordinarily produced by temperature change.

Significant manufacturing economies can be realized with the level vial of the invention since the vial can be readily produced either from straight wall tubing stock or relatively simple injection molding techniques. The core member, depending upon the precision required for various applications, can be injection-molded, machined, precision-ground, etc.

Lower manufacturing cost and greater versatility can be realized with the level vial of the invention since it is possible to form the peripheral concave portions of the core member with different radii of concave curvature while utilizing the same vial bodies. By varying the radius of curvature of the concave portion of the core member, the sensitivity of the completed level vial can be increased or decreased in proportion to the increase or decrease in the radius of concave curvature.

The vial construction which embodies a solid core construction will provide a more rigid structure which will be more resistant to damage or breakage.

It is also possible, utilizing the vial construction of the invention, to use elements in color contrast in the assembled unit to facilitate reading. For example, the level vial can be formed with a colorless transparent body portion, a colored bubble producing fluid and either an opaque or transparent colored core member. Other variations are possible.

Various other objects and advantages of the invention will hereinafter become more fully apparent from the following description of the drawings illustrating presently preferred embodiments thereof and wherein:

FIG. 1 is a fragmentary sectional view of a level vial made in accordance with the invention and installed on the frame of a level instrument;

FIG. 2 is a cross-section of the vial and frame illustrated in FIG. 1 and taken on lines 2—2 thereof;

FIG. 3 is a top plan view of a modified embodiment of the assembly illustrated in FIG. 1; and FIG. 4 is a side elevation of a level vial installed in the web portion of a level instrument frame.

FIGS. 1 and 2 of the drawings illustrate an embodiment of a plastic level vial, generally designated 1, installed in the body or frame portion 2 of a conventional level instrument in a manner such as is illustrated in U.S. patent to Donald E. Wright, 3,311,990, which issued Apr. 4, 1967. As is best seen in FIG. 2, the level vial 1 of the invention is positioned with the longitudinal axis thereof disposed in essentially the vertical plane of the frame 2 of the level instrument.

Referring now more particularly to FIG. 1, the body of level vial 1 is elongated along its longitudinal axis and includes an essentially cylindrical bore or bubble chamber 3 which is located generally mid-way between the respective ends 4 and 5 of the vial body. It has been found to be important to fabricate the plastic vial bodies from a plastic material having a high degree of transparency, dimensional stability under widely varying conditions and manufacturing workability. Such materials will permit essentially the most economical production of reliable level vial bodies. For best results, butyrates such as cellulose acetate butyrate, are preferred in the production of level vials made in accordance with the construction of the invention.

As shown in FIG. 1, the vial body is fabricated with a first generally cylindrical bore portion 6 which terminates inwardly of the vial end 4 at annular flange element 7 which is formed integrally with respect to the vial body. The annular flange 7 defines an opening 8 which opens into bubble chamber 3 and establishes communication between the bubble chamber and cylindrical bore 6. The opposite vial body end 5 is formed with a second and slightly larger cylindrical bore portion 9 which also establishes communication with bubble chamber 3.

A core member or pin generally designated 10, as shown in FIG. 1, is positioned with the major portion thereof disposed within bore or bubble chamber 3. Core member 10 is shown to embody an elongated generally cylindrical member. This member includes first cylindrical end 11 positioned adjacent vial body end 4 and within and enclosing opening 8 provided by annular flange 7. A second cylindrical end 12 of the core member 10 is located adjacent vial body end 5. A generally cylindrical cap portion 13 is integrally formed on the second cylindrical end 12 of the core member. The outer periphery of the cap portion 13 is positioned in liquid-tight contact with the internal periphery of the second cylindrical bore portion 9 at vial body end 5. The innermost end surface 14 of the cap portion is positioned in abutting generally fluid-tight engagement with stop portion 15 defining the axial inner end of the second cylindrical bore 9. The core member is formed with a peripherally continuous concave portion 16 located between the cylindrical ends 11 and 12 of the core member. The radius of curvature of the concavity is predetermined according to the sensitivity required of the instrument in a particular application.

A pair of spaced apart indicator guide lines or grooves 17 and 18 are provided on the external periphery of the core member 10 and are aligned in predetermined spaced relationship with respect to the axial midpoint of the bubble chamber 3 and the axial midpoint of the portion of the core member 10 located within the bubble chamber.

The generally cylindrical bore or bubble chamber 3 contains a liquid 19, such as one of the aliphatic hydrocarbons (commonly known as mineral spirits) or Stoddard solvents, in a volume insufficient to completely fill the bubble chamber 3. The volume of the liquid 19 introduced into the bubble chamber is predetermined to produce a bubble or void in the liquid containing bubble chamber 3 of a desired volume. This bubble or void 20 acts as a measuring or gauging indicia in relation to the spaced annular guide lines or grooves 17 and 18 formed on the outer periphery of the core member 10.

A primary liquid seal of the bore or bubble chamber 3 is produced at the end 4 of the vial body by the closure of the opening 8 by the first cylindrical end 11 of the core member. The vial body end 5 of the level vial 1 is provided with a primary liquid seal by the abutment of end surface 14 of cap portion 13 upon stop portion 15 of the vial body and the generally liquid-tight relationship of the cylindrical surface portion of the cap with the internal peripheral surface of the second cylindrical bore 9. An essentially permanent and hermetic chamber 3 of the level vial is produced by the application of an organic adhesive or resinous mass such as an epoxy resin, in the first and second cylindrical bores 6 and 9 adjacent the ends of the vial body.

In selecting the particular resin or organic adhesive to be applied as the secondary or hermetic seal of the liquid containing vial, the epoxy resins have been found to be reliable. These resins fulfill one of the most important requirements of an adhesive system in that they provide a high degree of dimensional stability and are generally impervious to fluid components contained in level vials. They also cure without significant production of heat and permit relatively little air or gas entrapment. Such resins, therefore, minimize distortion of the vial shape and leakage of the fluid contained by the vial.

It has been found that organic adhesives or resins which contain relatively high percentages of evaporative solvents tend to develop a substantial degree of resin shrinkage during the curing process as well as excessive air or gas entrapment. Such shrinkage can readily cause a distortion of the bore portion adjacent the end to which it is applied, adversely affecting the gauging capabilities of the vial. Shrinkage can eventually lead to fluid leakage from the bubble chamber.

When the vial 1 has been assembled and sealed as illustrated in FIG. 1, the longitudinal axis of the core member 10, as can be seen in both FIGS. 1 and 2, is aligned in essentially coaxial relationship with respect to the longitudinal axis of the cylindrical bore or bubble chamber 3. It is preferred that the cross-sectional radius of the concave portion 16 of core member 10 is smallest at essentially the midpoint of the curved portion of member 10 substantially as shown in FIG. 2. The depth or radius of curvature of the concave portion 16 decreases laterally from this midpoint in both axial directions. The concave portion 16, therefore, is formed with a predetermined radius of curvature, preferably formed in a manner such that the cross-sectional radius thereof, at substantially the midpoint of the member 10 in the bubble chamber 3, is a predetermined dimension and the radius of the concave portion at selected intervals along the longitudinal axis of the core member 10 in either axial direction from this midpoint will be progressively greater. It is preferred that the midpoint on concave portion 16 is aligned substantially in the cross-sectional plane of the midpoint of the bubble chamber 3.

In the assembly of the level vial elements of the invention, the core member 10 is initially inserted through the second cylindrical bore 9 of the vial body. The insertion of the core member is continued until the cap portion 13 thereof is brought within the confines of bore 9 with the peripheral cylindrical surface thereof located in essentially liquid-tight, although sliding engagement with the peripheral cylindrical surface defining the second cylindrical bore 9. This insertion also acts as the primary alignment step in establishing the coaxial relationship of the core member and bubble chamber. At this point, the first cylindrical end 11 of the core member is spaced completely below annular flange 7 and out of contact with opening 8 provided thereby. The predetermined quantity of liquid 19 is then introduced through cylindrical bore 6 and opening 8 into bore or bubble chamber 3. When the predetermined volume of liquid 19 has been introduced into the bubble chamber 3, the axial insertion of the core member 10 is continued until cylindrical end 11 projects into opening 8 into essentially fluid-tight contact with the wall of annular flange 7 defining opening 8 and until the internal end surface 14 of cap portion 13 of the core member is brought into abutting contact with the stop portion 15 of the vial body. At this point, the angular and axial alignment of the vial elements are established and upon sealing of the ends thereof, the level vial is ready for use.

The core member 10 secured within the bubble chamber 3 of the level vial of the invention is constructed to control the location of the bubble in relation to the indicator guide lines or grooves in accordance with a predetermined orientation of the longitudinal axis of the level chamber and core member. The construction of the core member is such that the peripheral edges of the bubble will be located essentially exactly between the spaced apart indicator guide lines when the predetermined angular relationship of the axes of the core member and bubble chamber has been established by either a working surface of the vial or a working surface of a level instrument in which the vial is secured and in relation to a surface being guaged. The radius of curvature of the concave portion 16 of the core member 10 causes the bubble 20 contained in the bubble chamber 3 of the vial to be centrally oriented in the bubble chamber when the longitudinal axis of the core member is aligned in a predetermined relationship with respect to a surface to be guaged. The displacement of the bubble 20 from between the indicator guide lines or grooves framed on either or both the vial or the core member is produced when other than the predetermined angular relationship between core member longitudinal axis and guaged working surface is established. This will cause the bubble 20 to move either towards end 4 or end 5 indicating improper level alignment. As the radius of curvature of the concave portion 16 of a core member 10 is increased, the sensitivity of bubble registry is proportionally increased and smaller increments of angular misalignment between the longitudinal axis of the core member and the surface being guaged will produce a more pronounced bubble travel to one end or the other level vial. Correspondingly, a decrease in the radius of curvature of the concave portion 16 of a core member will decrease the sensitivity of the level vial and bubble movement in the bubble chamber 3 of the vial will be less pronounced with angular deflection of the unit. In the event that no concave portion was formed in the core member or that the core member was completely eliminated from the vial structure, the cylindrical surfaces defining the bubble chamber 3 of the vial would make it substantially impossible to accurately control the position of the bubble in the chamber in relation to any angular relationship between the vial axis and a surface to be guaged. The result of such a structure would be the haphazard and random orientation of the bubble in the chamber which would be substantially useless for measurement purposes of any kind.

The level vial illustrated in FIG. 3 constitutes a slight modification of that illustrated in FIG. 1. In this instance, the indicator guide lines or grooves 21 and 22 are cut into the external periphery of the generally cylindrical level vial body, generally designated 23, and are omitted from the core member 10 thereof. As is shown, these indicator guide lines or grooves are formed in the periphery in the vial body 23 and in coaxial relationship with respect to the longitudinal axis of the vial body and, particularly, the longitudinal axis of the bubble chamber contained thereby. While this modification of the level vial of the invention may be employed in many applications and will accurately register the position of bubble 20 with respect to the guide lines 21 and 22 which are located to indicate a predetermined angular relationship of the longitudinal axis of the vial with respect to a workpiece, the guide line could be provided on both elements of the vial, as desired.

While the level vial of the invention is capable of being used in applications where the vial is installed on a frame element of a level instrument and subsequently adjusted to bring the longitudinal axis of the vial into a predetermined angular alignment with respect to the working surface of the level instrument, for example, in a manner such as is shown in the U.S. patent to Ziemann 2,810,206, it is preferred that, at least, a portion of the ends 4 and 5 of the level body are formed in concentric relationship with respect to the longitudinal axis of the bubble chamber and the core member. With these concentric or coaxial external vial portions, the vial ends 4 and 5 can be aligned with a pair of precision formed notches 24 and 25 spaced in opposed relationship on level frame 2 as shown in FIG. 4. The vial may be moved at essentially a right angle to the plane of the frame 2 to bring the vial into precision, close-fitting engagement with the notch defining surfaces. The disposition of the vial at this stage of assembly is such that the longitudinal axis of the bore or bubble chamber 3 and the core member 10 are aligned in parallel relationship with respect to the plane of the frame 2 as shown in FIG. 2. Essentially no further angular adjustment of the vial 1 is required although some lateral movement of the vial 1 with respect to the plane of the frame 2 may be made, if desired, and protective cover plates (not shown) may be applied over the level vial on opposite sides of the frame.

As is shown in FIG. 4, additional precision-formed and aligned notches 26 and 27 may be provided in the frame of a level instrument to permit the vial to be selectively disposed at other angular relationships with respect to the working surfaces 28 and 29 of such a level instrument.

In producing level vials according to the invention, the cross-sectional configuration of the bore or bubble chamber 3 and the cross-sectional configuration of the exterior of the vial body can be varied as required provided that the longitudinal axes of both the bubble chamber 3 and the core member 10 are maintained in substantially coaxial relationship.

I claim:

1. A level vial comprising a body, the body being provided with a cylindrical bore having opposed ends, a member disposed within the cylindrical bore of the body and between the ends thereof, the member constricting the space between it and the bore forming surface progressively more at points further away from the intermediate portion of the bore, a quantity of fluid disposed within the bore, means hermetically sealing the fluid within the bore, the quantity of fluid hermetically sealed within the bore being insufficient to completely fill the bore thereby providing a bubble therein, the bubble being of a size sufficient to simultaneously contact the bore forming surface and the member, and indicator means for indicating a preselected position of the bubble with respect to the leveling surface and the member, the body being transparent at least in a portion adjacent the indicator means to permit visual observation of the bubble with respect thereto, the member being disposed to co-act with the cylindrical bore surface to produce progressive bubble constriction therebetween as the bubble is displaced from its preselected position relative to the indicator means.

2. The level vial of claim 1 wherein the bore is an elongated cylinder and the member provided within the bore is elongated and has the longitudinal axis thereof disposed in parallel relationship to the longitudinal axis of the cylindrical bore.

3. The level vial of claim 2 wherein the intermediate portion of the member disposed between the portions of the member adjacent the bore ends is coaxially disposed with respect to the longitudinal axis of the cylindrical bore.

4. The level vial of claim 3 wherein the coaxially disposed portion of the member is in longitudinal section a generally peripherally continuous concavity, the radius of the member at substantially the midpoint of the longitudinal axis of the member disposed within the bore measured in any plane containing of the bore being a predetermined dimension, the radial dimension of the member at selected positions in the said plane spaced at intervals from the midpoint and in either direction with respect thereto being greater than the radial dimension at the midpoint to produce progressive bubble deformity as bubble displacement from a normal position within the bore occurs.

5. The level vial of claim 3 wherein the bore is a circular cylinder, the member is coaxially disposed with respect to the longitudinal axis of the circular cylindrical bore, and the outer peripheral surface portion of the member disposed within the bore is disposed in concentric relationship with respect to the longitudinal axis of the bore.

6. The level vial of claim 1 wherein means are provided at one end of the bore to align the member in predetermined relationship with respect to the longitudinal axis of the bore.

7. The level vial of claim 1 wherein means are provided at least at one end of the bore for introducing fluid therein and means are provided to hermetically seal the fluid introducing end of the bore, the fluid introducing means being disposed to provide a means for aligning an end of the member with respect to the body surface defining the bore.

8. The level vial of claim 7 wherein the member comprises an element of the hermetic sealing means.

9. The level vial of claim 1 wherein the bore opens from opposite ends of the level vial body and wherein the member is both located in a predetermined relationship in the bore by the open ends and serves as a closure of the open bore ends.

10. The level vial of claim 1 wherein the intermediate portion of the member is in longitudinal section formed with a generally peripherally continuous concavity and the concavity is formed with a predetermined radius of concave curvature in accordance with the sensitivity of measurement required of the level vial.

11. The level vial of claim 1 wherein the indicator means include lines provided on the member to reduce parallax distortion in leveling operations.

12. The level of claim 1 wherein at least a portion of the body and the member are made in color contrast to facilitate reading of the bubble position in the bore portion of the vial.

References Cited
UNITED STATES PATENTS

| | | | |
|---|---|---|---|
| 612,577 | 10/1898 | Smith | 33—211 |
| 771,803 | 11/1904 | Bishop | 33—211 |
| 1,654,248 | 12/1927 | Erdmann | 33—211 |
| 3,020,506 | 2/1962 | Remington et al. | 33—206 |

LEONARD FORMAN, Primary Examiner

C. E. PHILLIPS, Assistant Examiner